US012444883B2

(12) United States Patent
Ge

(10) Patent No.: US 12,444,883 B2
(45) Date of Patent: Oct. 14, 2025

(54) SNAP-IN TERMINAL FOR CONDUCTOR

(71) Applicant: Weidmüller Interface GmbH & Co. KG, Detmold (DE)

(72) Inventor: Xuefeng Ge, Henrico, VA (US)

(73) Assignee: Weidmüller Interface GmbH & Co. KG (DE)

( * ) Notice: Subject to any disclaimer, the term of this patent is extended or adjusted under 35 U.S.C. 154(b) by 367 days.

(21) Appl. No.: 18/160,157

(22) Filed: Jan. 26, 2023

(65) Prior Publication Data

US 2024/0258744 A1 Aug. 1, 2024

(51) Int. Cl.

| | |
|---|---|
| ***H01R 13/62*** | (2006.01) |
| ***H01R 4/40*** | (2006.01) |
| ***H01R 4/48*** | (2006.01) |
| ***H01R 13/629*** | (2006.01) |
| ***H01R 13/639*** | (2006.01) |

(52) U.S. Cl.

CPC ......... *H01R 13/62955* (2013.01); *H01R 4/40* (2013.01); *H01R 4/48* (2013.01); *H01R 13/639* (2013.01)

(58) Field of Classification Search

CPC ...... H01R 13/62955; H01R 4/40; H01R 4/48; H01R 13/639; H01R 4/4814; H01R 4/4821; H01R 4/4833; H01R 4/483

USPC .......................................................... 439/345

See application file for complete search history.

(56) References Cited

U.S. PATENT DOCUMENTS

2016/0049737 A1* 2/2016 Aporius ............... H01R 13/633 439/733.1
2022/0158368 A1* 5/2022 Berghahn ............. H01R 4/4833
2022/0190493 A1* 6/2022 Fehling ................ H01R 4/4835
2022/0320759 A1* 10/2022 Böcker ................ H01R 13/193
2022/0399658 A1* 12/2022 Hoppmann .......... H01R 4/4835
2022/0416448 A1* 12/2022 Gebhardt ............. H01R 4/4835

* cited by examiner

*Primary Examiner* — Peter G Leigh
*Assistant Examiner* — Jeffrey Mountain
(74) *Attorney, Agent, or Firm* — LAUBSCHER & FRETWELL, P.C.

(57) ABSTRACT

A snap-in terminal connector for a conductor includes a housing having a first opening for receiving the conductor and a second opening arranged at an angle, and preferably perpendicular, relative to the first opening for an actuator for the connector. The connector includes a bus bar, a clamping spring, and a rotatable lever operable by the actuator. The clamping spring is mounted on the housing and includes integral clamping and support legs. The clamping leg is operable between latching and clamping conditions. The actuator is operable to rotate the lever which tensions the clamping spring by pressing the clamping leg toward the support leg. A retaining assembly on the support leg retains the clamping leg in the latching position. When a conductor is inserted into the housing first opening, the leading end of the conductor presses against the clamping spring support leg to release the clamping leg which presses the conductor against the bus bar and retains the conductor within the housing.

12 Claims, 5 Drawing Sheets

SNAP-IN TERMINAL FOR CONDUCTOR

BACKGROUND OF THE INVENTION

The present invention relates to a spring-loaded terminal having a busbar which is provided for contacting an electrical conductor, in particular a stranded conductor, and having a spring which is provided for fixing the electrical conductor in the spring-loaded terminal.

BRIEF DESCRIPTION OF THE PRIOR ART

Such spring-loaded terminals in the form of direct plug-in, push-in or snap-in terminals with a compression spring that presses the conductor against the busbar are known in the prior art.

US patent application publication No. 2022/0416449, for example, discloses a spring-loaded connection terminal including a clamping spring and a retaining spring arranged in a housing. A conductor is inserted into a first opening in the housing in a first direction for connection with a busbar. The clamping spring includes a clamping leg which is operable between latching and clamping positions. The clamping leg is normally in the latched position so that the conductor may be inserted into the housing. Upon insertion, the conductor engages the retaining spring and pivots the retaining spring to release the clamping leg of the clamping spring. The clamping leg engages the conductor to retain it in the housing. An actuator is displaceable in a second opening in the housing in a direction parallel to the first direction and is operable to engage the clamping leg and return it to a latching position to the conductor so that it may be removed from the housing.

While spring-loaded connection terminals as described above operate satisfactorily, they possess certain inherent drawbacks. For example, use of the terminals are restricted to an environment in which the conductor may only be inserted into the housing in a direction parallel to the direction of operation of the actuating lever. In addition, the actuator is a large device which increases the size of the terminal.

Thus, there is a need for a compact connection terminal including a single clamping spring which is actuated in a direction other than parallel to the insertion direction of a conductor being connected.

SUMMARY OF THE INVENTION

Accordingly, it is a primary object of the invention to provide a snap-in connector for a conductor including a housing containing a chamber, a first opening for receiving a conductor, and a second opening arranged at an angle, and preferably perpendicular, relative to the first opening. A busbar and a clamping spring are arranged in the housing chamber. The clamping spring is operable between latching and clamping positions. In the latching position of the clamping spring, the housing first opening is configured to receive the conductor. In the clamping position, the clamping spring presses the conductor against the busbar and retains the conductor within the housing. A retaining element on the clamping spring retains the spring in the latching position. A clamping leg of the clamping spring is pivotable in a first direction from the latching position to the clamping position. The retaining element is actuated by the conductor as it is inserted into the first opening of the housing to release the clamping leg from the latching position for movement in the pivoting direction to the clamping position. A rotatable lever is arranged in the housing chamber and is operable to pivot the clamping leg in a second direction opposite the first direction into engagement with the retaining element to return the clamping spring to the latching position. In addition, an actuator is arranged in the housing second opening to engage and rotate the lever to pivot the clamping leg in the second direction and return the clamping spring to the latching position as the actuator enters the housing second opening.

The clamping spring includes a support leg on which the retaining element is mounted. More particularly, the support leg is mounted on a spring support to the housing. The end of the conductor engages the support leg to release the retaining element as the conductor is inserted into the housing first opening.

The housing further includes a concave recess in a lower portion thereof. The recess is configured to receive a cylindrical projection of the rotatable lever. Accordingly, the lever is rotatable in a first direction relative to the housing when the actuator is inserted into the housing second opening. The lever further includes a contoured projection spaced from the cylindrical projection. The contoured projection is configured to engage and pivot the clamping leg in the second direction to tension the clamping spring and latch the clamping leg with the retaining element when the lever is rotated by the actuator to return the clamping spring to the latching position.

BRIEF DESCRIPTION OF THE FIGURES

Other objects and advantages of the subject invention will become apparent from a study of the following description when viewed in the light of the accompanying drawing, in which.

DETAILED DESCRIPTION

Figure 1:
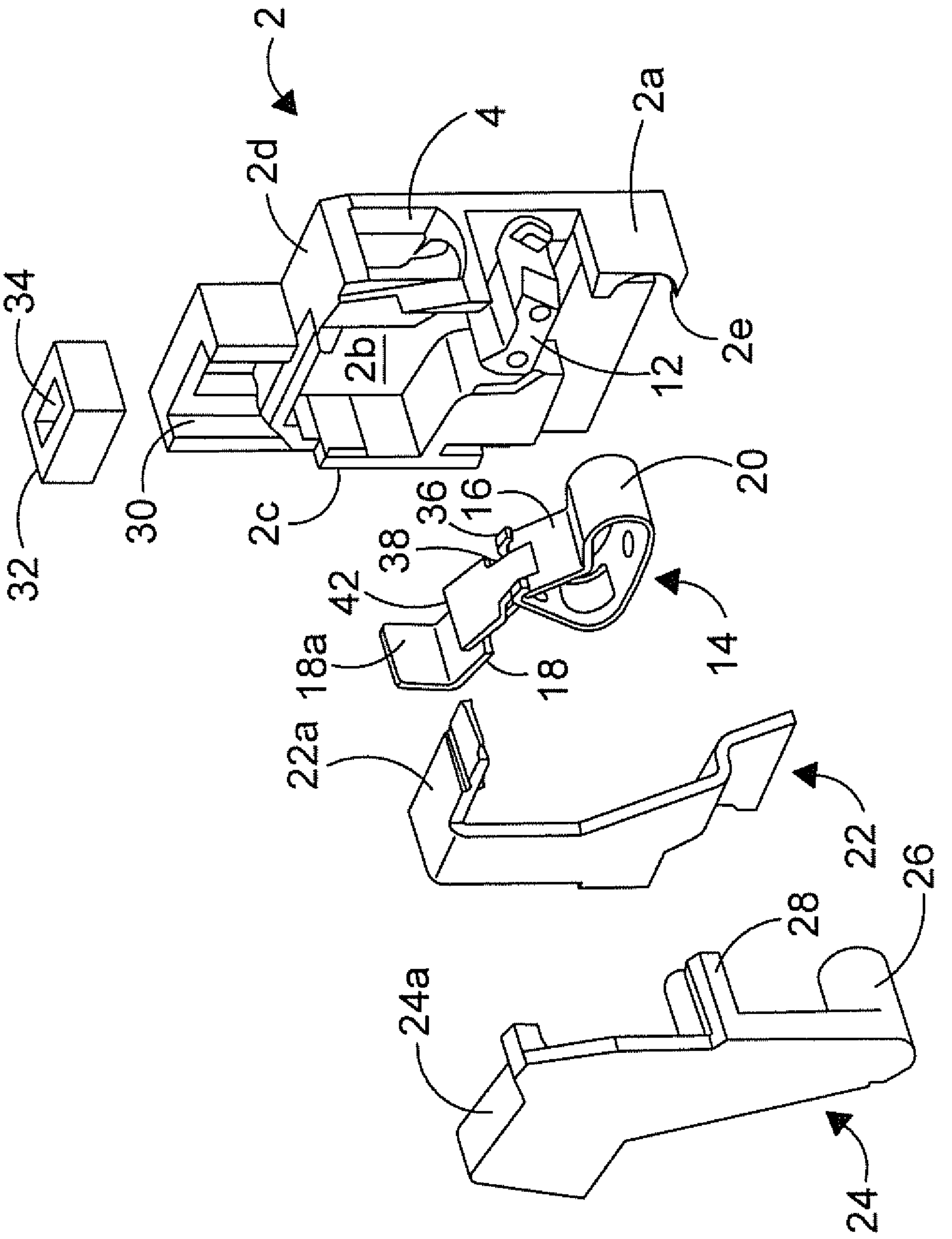
FIGS. 1 and 2 are exploded and partially assembled perspective views, respectively, of a snap-in terminal for a conductor according to the invention in a latched position for receiving a conductor.
Figure 6:
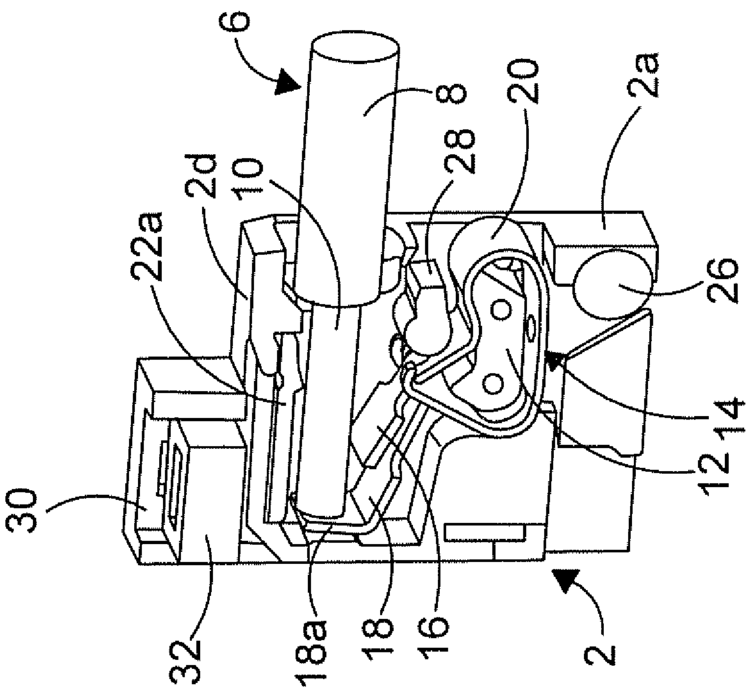
FIG. 6 is a cutaway perspective view of the terminal of FIG. 5 with a conductor inserted into the housing upon engagement with the clamping spring.

As shown in FIG. 1, the snap-in terminal according to the invention includes a housing containing a chamber. The housing is preferably formed of two mating sections. In the drawing, only one section, i.e. a side section 2, is shown so that the interior of the housing is visible. A first opening 4 is arranged in the housing section and is configured to receive a conductor such as an electrical conductor 6 as shown in FIG. 6. Such a conductor typically includes an outer insulating layer 8 and an inner metal layer 10 which may be solid or braided. The stripped end of the conductor may also be fitted with a ferrule. In the embodiment shown in FIG. 1, the first opening 4 is in the front wall 2_a_ of the housing section and the conductor is inserted into the housing in a first direction.

Figure 5:
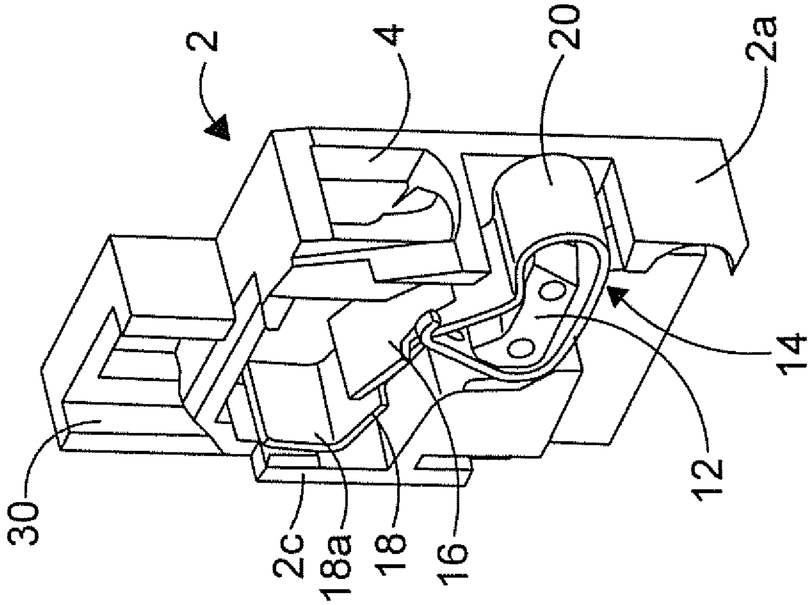
FIG. 5 is a cutaway perspective view of the terminal of FIGS. 1 and 2 with a clamping spring arranged in the housing.

Within the housing chamber, the housing includes a support member 12 extending from a side wall 2*b* of the housing section. The support member is configured to support a clamping spring 14 as shown in FIG. 5. The clamping spring includes a clamping leg 16 and a support leg 18 which are joined by a spring region 20 which normally biases the support and clamping legs away from each other. The clamping leg 16 is initially supported by the support member 12 of the housing section when the clamping spring is in a latching position as will be developed below. More particularly, the support element 12 restrains the clamping spring 14 within the housing chamber when the spring is in a tensioned state. The spring further supports itself in the tensioned state using the natural force of the spring region 20 of the spring 14. In addition, the support leg 18 of the clamping spring terminates in an end portion 18*a* which extends upwardly in alignment with the first opening 4 of the housing section. The support leg end portion 18*a* is spaced from the rear wall 2*c* of the housing section.

A bus bar 22 is also arranged in the housing chamber. The bus bar includes an upper portion 22*a* which extends parallel to a top wall 2*d* of the housing section and above the conductor 6 as shown in FIG. 6. The bus bar is configured for electrical connection with an electrical device or module.

A rotatable lever 24 is also arranged in the housing chamber. The lever includes a relatively flat upper surface 24*a* and a cylindrical projection 26 which extends from a bottom portion of the lever toward the side wall 2*b* of the housing section 2. In addition, the rotatable lever includes a contoured projection 28 between the top surface 24*a* and the cylindrical projection 26. The contoured projection 28 also extends toward the housing section side wall 2*b*. When the rotatable lever is installed in the housing section, the cylindrical projection is arranged within a concave recess 2*e* in the bottom of the housing front wall 2*a* and the contoured projection 28 is arranged above the clamping spring clamping leg 16 as shown in FIG. 6. The lever is configured to rotate relative to the housing section about an axis at the center of the cylindrical projection 26.

Figure 2:
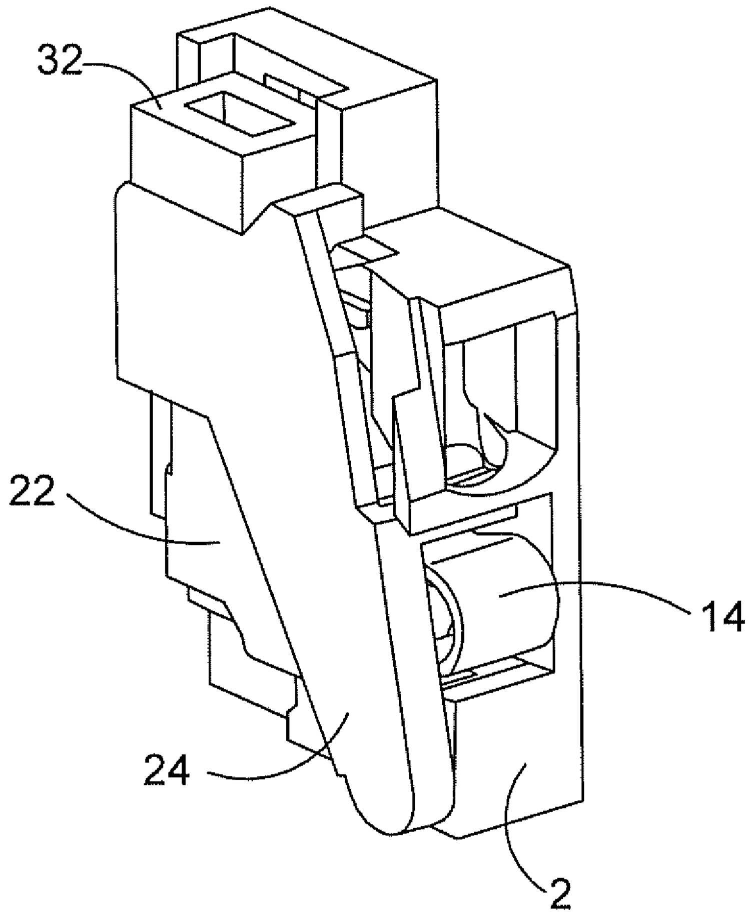
Figure 4:
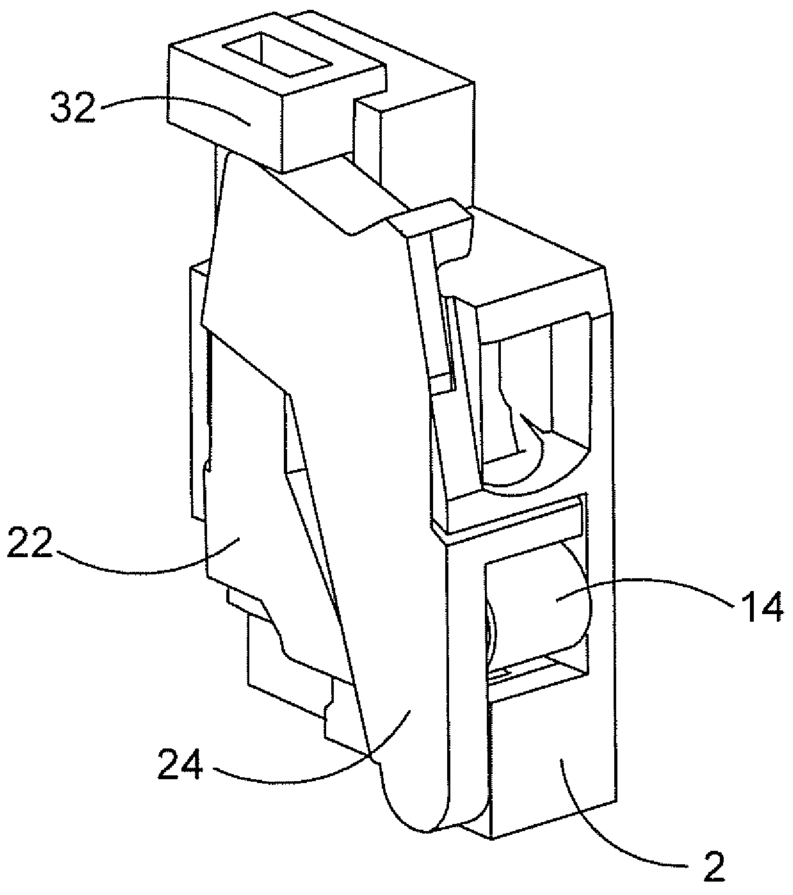

The housing section 2 further contains a second opening 30 in the top wall 2*d*. The second opening is thus arranged perpendicular to the first opening 4 for receiving the conductor in a second direction perpendicular to the first direction of insertion of the conductor. It will be appreciated that the second opening may be arranged at an angle other than 90° relative to the first direction of insertion of the conductor. An actuator 32 is arranged in the second opening and configured for movement in and out of the housing section via the second opening. The actuator contains a recess 34 in a top wall for receiving a tool such as the end of a screwdriver or other pushing element (not shown) from the exterior of the housing for displacing the actuator into the housing section. As shown in FIGS. 2 and 4, the actuator abuts against the top surface 24*a* of the rotatable lever 24.

Figure 3:
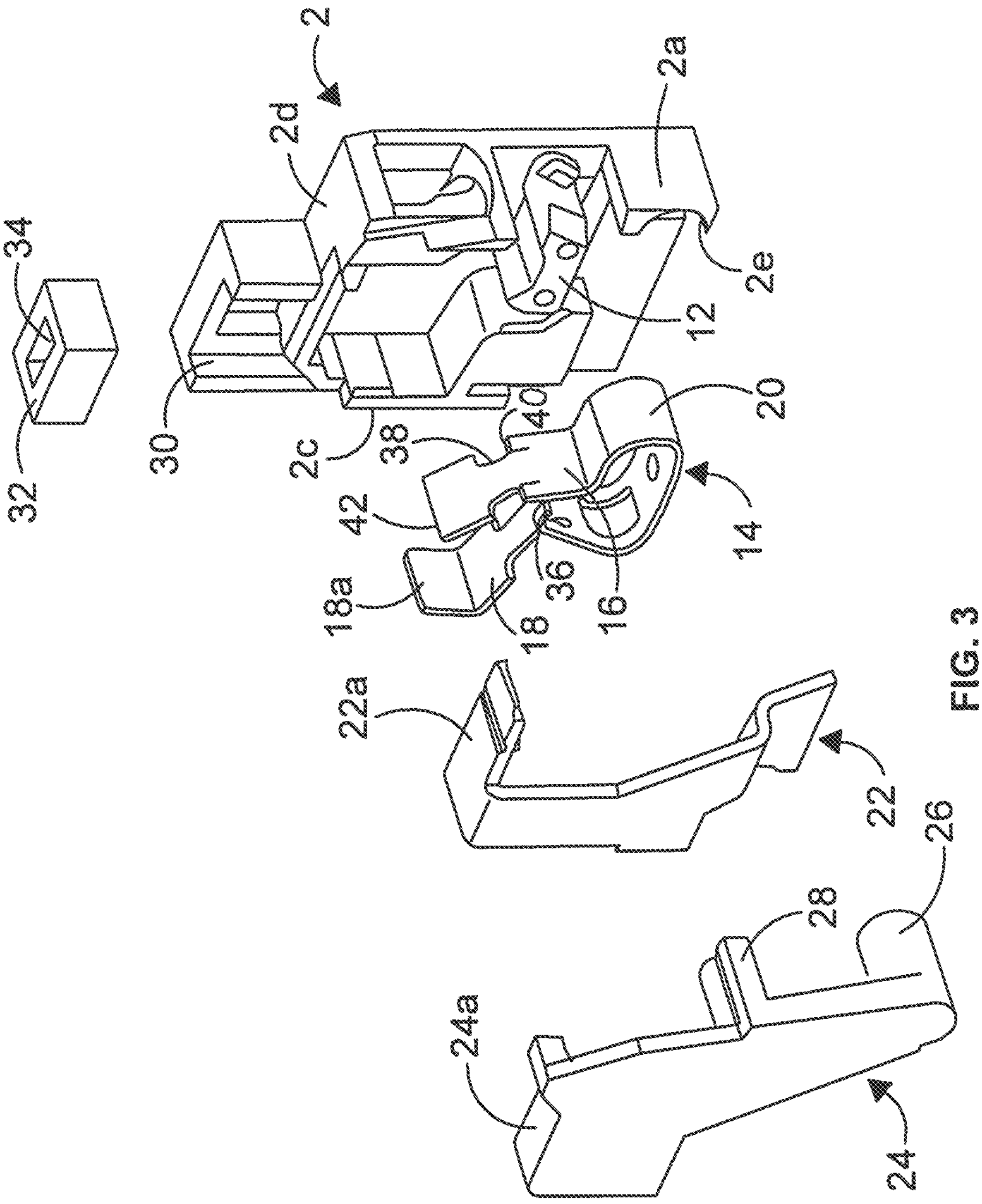
FIGS. 3 and 4 are exploded and partially assembled perspective views, respectively, of a snap-in terminal for a conductor according to the invention in a clamping position for pressing a conductor against a busbar in the terminal housing.

The clamping spring is operable between a latching position shown in FIG. 1 and a clamping position shown in FIG. 3. In this regard, the clamping spring includes at least one retaining element which retains the spring in the latching position. More particularly, the support leg 18 includes a spaced pair of hook portions or retaining elements 36 which extend from an intermediate portion of the support leg. The clamping leg 16 includes cut-out regions 38 on the side edges of the leg which define retention edges 40 of the clamping leg. In the latching position (FIG. 1), the hook portions 36 of the support leg 18 engage and hold the retention edges 40 of the clamping leg, whereas in the clamping position (FIG. 3), the retention edges 40 of the clamping leg are released from the hook portions 36.

In operation, the terminal according to the invention is placed in an open position for receiving a conductor by pressing the actuator 32 into the housing against the upper surface 24*a* of the rotatable lever 24 as shown in FIG. 2. The downward movement of the actuator causes a rotational movement of the rotatable lever 24 in a counter-clockwise direction relative to the housing section. With this rotational movement, the contoured projection 28 of the lever presses the clamping leg 16 of the clamping spring downwardly so that the retention edges 40 of the clamping leg are engaged and retained by the hook portions 36 of the support leg. This movement of the clamping spring to the latching position tensions the spring. The latching position of the clamping spring within the housing is also shown in FIG. 5.

When the conductor is inserted into the housing first opening 4, the forward end of the inner metal layer or component 10 of the conductor presses against the end portion 18*a* of the support leg 18 of the clamping spring. Referring to FIG. 6, the conductor 6 is shown in its initial insertion position within the housing section. In this initial insertion position, the end of the conductor is in contact with the end portion 18*a* of the support leg. At this point, the clamping spring is still in the tensioned latching position with the clamping leg of the spring being retained by the support leg. Further insertion of the conductor into the housing section first opening displaces the upper end 18*a* of the support leg toward the housing section rear wall 2*c* since the clamping leg is initially spaced from the rear wall as described above. The displacement of the support leg moves the hook portions 36 of the support leg away from the retention edges 40 of the clamping leg, thereby releasing the clamping leg for movement to the clamping position shown in FIGS. 3 and 4 owing to release of the tension in the spring. In this position, a clamping edge 42 of the clamping leg 16 presses against the metal component 10 of the conductor, thereby pressing the metal component against the upper portion 22*a* of the busbar and retaining the conductor within the terminal housing. The contact area of the conductor metal component with the busbar is located between the actuator and the clamping spring.

The release of the clamping leg of the clamping spring for movement to the clamping position also rotates the rotatable lever in a clockwise direction which in turn displaces the actuator upwardly to the position shown in FIG. 4. Thus, the position of the actuator provides a visual indication of clamping spring in the clamping position. In either position of the clamping spring, the actuator is retained within the housing to prevent its loss.

The inner surface of the housing section top wall 2*d* is configured to guide the conductor into the housing section via the opening 4 within the conductor contacting the clamping edge 42 of the clamping leg of the spring. This preserves the integrity of the clamping edge. The contours of the actuator and rotatable lever provide even actuation of the terminal into the latching position of the clamping spring as well as limit to the displacement of the clamping spring to prevent over-tensioning of the spring.

The housing, rotatable lever and actuator are preferably formed of an insulating material such as synthetic plastic. The clamping spring is formed of resilient material such as synthetic plastic or metal and the busbar is formed of a conductive material such as metal, preferably copper.

In the above description, the terms top, bottom, side, clockwise, and counter-clockwise are used as they relate to the depiction of the inventive terminal as shown in the drawing figures. It will be appreciated by those of ordinary skill in the art that the invention is not limited to any particular orientation.

While the preferred forms and embodiments of the invention have been illustrated and described, it will be apparent to those of ordinary skill in the art that various changes and modifications may be made without deviating from the inventive concepts set forth above.

What is claimed is:

1. A snap-in connector for a conductor, comprising (a) a housing containing a chamber, a first opening for receiving a conductor, and a second opening arranged at an angle relative to said first opening;

(b) a busbar arranged in said housing chamber;

(c) a clamping spring arranged in said housing and operable between a latching position in which said first opening is configured to receive the conductor and a clamping position in which said clamping spring presses the conductor against the busbar and retains the conductor within said housing, said clamping spring having a support leg including a retaining element which retains said clamping spring in the latching position and a clamping leg which is pivotable in a first direction from the latching position to the clamping position, said retaining element being actuated by the conductor as the conductor is inserted into said first housing opening to release said clamping leg from the latching position for movement in said first direction to the clamping position; and (d) a rotatable lever arranged in said housing chamber and operable to pivot said clamping leg in a second direction opposite the first direction into engagement with said retaining element to return said clamping spring to the latching position.

2. A snap-in connector as defined in claim 1, and further comprising an actuator arranged in said housing second opening, said actuator engaging said rotatable lever and rotating said lever to pivot said clamping leg in the second direction and return said clamping spring to the latching position as said actuator enters said housing second opening.

3. A snap-in connector as defined in claim 2, wherein said actuator is operable from outside said housing.

4. A snap-in connector as defined in claim 3, wherein said actuator is displaced in a linear direction at said angle relative to the insertion direction of the conductor to rotate said rotatable lever and said clamping spring to the latching position.

5. A snap-in connector as defined in claim 1, wherein said clamping leg is configured for retention within said housing when said clamping spring is in both the latching and clamping positions.

6. A snap-in connector as defined in claim 1, wherein said housing includes a spring support, said support leg of said clamping spring being mounted on said spring support.

7. A snap-in connector as defined in claim 6, wherein an end of the conductor engages said support leg to release said retaining element as the conductor is inserted into said housing first opening.

8. A snap-in connection for a conductor, comprising (a) a housing containing a chamber, a first opening for receiving a conductor, and a second opening arranged at an angle relative to said first opening;

(b) a busbar arranged in said housing chamber;

(c) a clamping spring arranged in said housing and operable between a latching position in which said first opening is configured to receive the conductor and a clamping position in which said clamping spring presses the conductor against the busbar and retains the conductor within said housing, said clamping spring having a retaining element which retains said clamping spring in the latching position and a clamping leg which is pivotable in a first direction from the latching position to the clamping position, said retaining element being actuated by the conductor as the conductor is inserted into said first housing opening to release said clamping leg from the latching position for movement in said first direction to the clamping position;

(d) a rotatable lever arranged in said housing chamber and operable to pivot said clamping leg in a second direction opposite the first direction into engagement with said retaining element to return said clamping spring to the latching position; and (e) an actuator arranged in said housing second opening, said actuator engaging said rotatable lever and rotating said lever to pivot said clamping leg in the second direction and return said clamping spring to the latching position as said actuator enters said housing second opening, wherein said housing contains a concave recess in a lower portion thereof and said rotatable lever includes a cylindrical projection which is arranged in said housing concave recess for rotation in a first direction relative to said housing when said actuator is inserted into said housing second opening.

9. A snap-in connector as defined in claim 8, wherein said rotatable lever includes a contoured projection spaced from said cylindrical projection and configured to engage said clamping leg and pivot said clamping leg in the second direction to tension said clamping spring and latch said clamping leg with said retaining element when said rotatable lever is rotated by said actuator to return said clamping spring to the latching position.

10. A snap-in connector as defined in claim 9, wherein said retaining element comprises a pair of spaced hook portions which engage respective portions of said clamping leg when said clamping spring is in the latching position.

11. A snap-in connector as defined in claim 1, wherein said bus bar is arranged in said housing between said clamping spring and said rotatable lever.

12. A snap-in connector as defined in claim 1, wherein said housing second opening is arranged perpendicular to said housing first opening.

* * * * *